(12) United States Patent
Palffy-Muhoray et al.

(10) Patent No.: US 7,692,731 B2
(45) Date of Patent: Apr. 6, 2010

(54) ELECTRIC POWER GENERATION USING LIQUID CRYSTALS

(75) Inventors: Peter Palffy-Muhoray, Kent, OH (US); Antal Jakli, Kent, OH (US); Bahman Taheri, Hudson, OH (US)

(73) Assignee: Kent State University, Kent, OH (US)

( * ) Notice: Subject to any disclaimer, the term of this patent is extended or adjusted under 35 U.S.C. 154(b) by 1100 days.

(21) Appl. No.: 11/270,405

(22) Filed: Nov. 9, 2005

(65) Prior Publication Data
US 2009/0218908 A1    Sep. 3, 2009

Related U.S. Application Data

(60) Provisional application No. 60/626,766, filed on Nov. 10, 2004.

(51) Int. Cl.
*G02F 1/1333* (2006.01)
(52) U.S. Cl. .......................... 349/50; 349/170
(58) Field of Classification Search .................. 349/50, 349/170
See application file for complete search history.

(56) References Cited

U.S. PATENT DOCUMENTS

| | | | |
|---|---|---|---|
| 4,037,062 A | 7/1977 | Fergason |
| 5,335,210 A | 8/1994 | Bernstein |
| 6,545,384 B1 | 4/2003 | Pelrine et al. |

FOREIGN PATENT DOCUMENTS

| DE | 195 03 563 C1 | 3/1996 |
|---|---|---|
| EP | 1 195 882 A | 4/2002 |

OTHER PUBLICATIONS

Ashley, Steven, "Artificial Muscles", *Scientific American*, vol. 289, Issue 4, Oct. 2003, pp. 53-59.

*Primary Examiner*—David Nelms
*Assistant Examiner*—Phu Vu
(74) *Attorney, Agent, or Firm*—Fay Sharpe LLP

(57) ABSTRACT

A new way of generating electrical power by changing the dielectric properties of liquid crystals by mechanical means is described. Such a method and device take advantage of the nature of the liquid crystal as the dielectric material in a capacitor. A broad range of materials, including various liquid crystalline materials, as well as additional mechanisms (flexoelectric polarization) to fully exploit the potential of this mechanism may be realized. Applications of this technology may be useful in wearable personal electric generators as well as in noise damping materials/devices, which not only absorb and dissipate sound, but use it to generate electric power.

16 Claims, 2 Drawing Sheets

ELECTRIC POWER GENERATION USING LIQUID CRYSTALS

This application claims the priority benefit of U.S. application Ser. No. 60/626,766, filed Nov. 10, 2004, the disclosure of which is incorporated herein by reference.

BACKGROUND

The present exemplary embodiments relate to the generation of electric power using liquid crystals. It finds particular application in conjunction with the generation of power via the change of dielectric properties of liquid crystals, and will be described with particular reference thereto. However, it is to be appreciated that the present exemplary embodiments are also amenable to other like applications.

In recent years, there has been a well documented need for the small-scale generation of electrical power to power personal electronic devices. Various materials and compositions have been used in devices designed to convert between mechanical and electrical energy.

Several "smart materials" have been used to convert between electrical and mechanical energy with limited success. These smart materials include piezoelectric ceramics, shape memory alloys and magnetostrictive materials. However, each smart material has a number of limitations that prevent its broad usage. Certain piezoelectric ceramics, such as lead zirconium titanate (PZT), have been used to convert electrical to mechanical energy. While having suitable efficiency for a few applications, these piezoelectric ceramics are typically limited to a strain below about 1.6 percent and are often not suitable for applications requiring greater strains than this. In addition, the high density of these materials often eliminates them from applications requiring low weight. Irradiated polyvinylidene difluoride (PVDF) is an electroactive polymer reported to have a strain of up to 4 percent when converting from electrical to mechanical energy. Similar to the piezoelectric ceramics, the PVDF is often not suitable for applications requiring strains greater than 4 percent. Shape memory alloys, such as nitinol, are capable of large strains and force outputs. These shape memory alloys have been limited from broad use by unacceptable energy efficiency, poor response time and prohibitive cost.

It is known that if a capacitor is charged, and the capacitance is then changed by pulling the charged plates apart, mechanical work is done and electrical energy is produced. This is the basis of existing 'heel-strike generators' using elastomer capacitors. The use of electroactive polymers in the fabrication of devices to convert between mechanical and electrical energy is disclosed in U.S. Pat. No. 6,545,384 to Pelrine et al. and related patents. These patents disclose polymers that convert between electrical and mechanical energy. When a voltage is applied to electrodes contacting a prestrained polymer, the polymer deflects. This deflection may be used to do mechanical work. Similarly, when the polymer deflects, an electric field is produced in the polymer. This electric field may be used to produce electrical energy.

Liquid crystal cells, such as those used in displays, are also capacitors, with capacitance determined by the thickness and area of the film and by the dielectric permittivity of the liquid crystal material. The dielectric permittivity in turn depends on the liquid crystal orientation; its effective value can be changed by changing the director orientation. The director orientation of the liquid crystal can be changed in several ways. One way to change the director orientation is by mechanical means, which thereby induces a flow of the liquid crystal. This can be accomplished in a number of ways, such as by reducing the separation of the plates or by mechanical shear (moving one plate relative to the other one) or by creating a pressure difference between two edges of the film.

In liquid crystals, there is coupling of the flow and director rotation. Flow reorients the director, and, conversely, director reorientation induces flow. When flow is induced in a liquid crystal, the flow induced director reorientation results in a change of the capacitance of the cell. For example, if the liquid crystal molecules are oriented initially perpendicular to the film surfaces of the liquid crystal cell, shear flow will typically reorient them so that they become almost parallel to the surfaces. If the dielectric constant is larger in the initial configuration then in the final one, as is the case for materials with positive dielectric anisotropy, the capacitance of the cell will decrease with shear.

If the capacitor is initially charged to a voltage $V_o$, the reorientation due to shear will cause the voltage to rise. Alternately, if a dc voltage is applied to the capacitor, say from a battery, the shear induced reorientation will result in an electric current flowing into the voltage source, charging the battery. When the flow stops, there is no shear and the director relaxes to its original configuration. This enables periodic repetition of the above process.

BRIEF DESCRIPTION

In accordance with one aspect of the present exemplary embodiment, there is provided a device for generating electrical energy, the device including a liquid crystal cell arranged in a manner such that the capacitance of the liquid crystal cell may be altered by mechanically changing the dielectric properties of the liquid crystal by reorientation of the liquid crystal director.

In accordance with a second aspect of the present exemplary embodiments, there is provided a method for producing electrical energy from the reorientation of a director in a liquid crystal cell, the method including the steps of connecting a voltage source having a voltage to a liquid crystal cell containing homeotropically aligned liquid crystal molecules causing current to flow into the liquid crystal cell, disconnecting the liquid crystal cell from the battery, reorienting a director of the liquid crystal molecules via the application of a mechanical stress thereby causing the voltage in the liquid crystal cell to rise, connecting a voltage source to the liquid crystal cell causing current to flow from the cell into the voltage source, disconnecting the cell from the voltage source, allowing the liquid crystal molecules to return to a homeotropic alignment, and, optionally, repeating the above steps.

DETAILED DESCRIPTION

The present exemplary embodiments use a unique aspect of liquid crystals, mechanically tunable dielectric properties, to generate electricity. These embodiments utilize a liquid crystal cell, which functions as a capacitor, to generate current.

Figure 1:
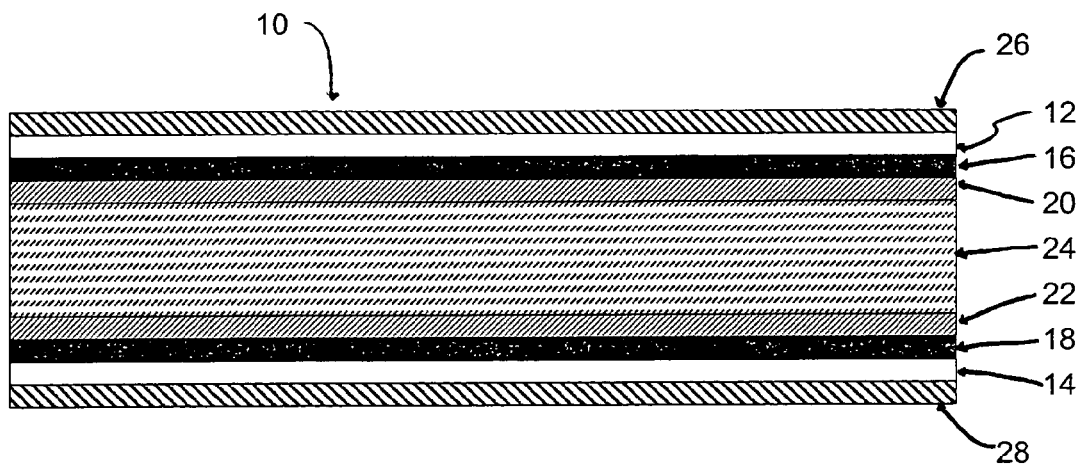
FIG. 1 is a depiction of a conventional liquid crystal cell.

A typical liquid crystal cell is displayed in FIG. 1. To allow the optical properties of a liquid crystalline material to be used, the director profile must be constrained, within a cell. This is done by treating two substrates to produce either homogeneous alignment (director parallel to the substrate) or homeotropic alignment (director perpendicular to the substrate) at the surface. This surface anchoring then influences the director profile through the bulk of the cell.

In the liquid crystal cell 10, two substrates 12, 14 are used to bound the cell on the top and bottom. The substrates 12, 14 used to build the cell may be any conventional material as described below. The substrates may be conductive or have a conductive layer deposited or coated thereon. Electrodes 16, 18 may be formed on inside surfaces of the two substrates to allow a voltage to be held across the cell. Alignment layers 20, 22 may be applied on top of the electrodes if desired. The cell may be spaced by applying a line of UV-setting glue with spacer beads (not shown) dispersed in it along two sides of the cell and sandwiching the two substrates together. Once the glue is set, the cell is filled with a liquid crystal material 24. Polarizers 26, 28 may also be disposed on top of the substrates. Other cell arrangements are also possible.

There is no particular restriction in the favor of substrates to be used in the present invention, and the forms of the substrate to be used may vary depending on the purpose of use, etc. Generally, substrates of plate-form, sheet-form or film form made of glass are preferably used in the present invention, and it is particularly preferable to use film form substrates to take advantage of their fitness to continuous production systems. Of course, other types of substrates may also be used as well. One type of substrate that allows one to advantageously change the shape of the cell is flexible plastic films.

The thickness of the substrates may be selected according to the qualities of the substrates such as the degree of transparency, flexibility, strength, and processability, the end use of one device, etc., and, although not intended to be limiting, may be generally from about 5 to about 1000 μm.

The electrode layer to be used may be a conventional one, and some illustrative examples of the electrode layer include tin oxide film, indium oxide layer wherein tin oxide is mixed (ITO film), and thin films of metals such as gold and titanium, which are thin films having good conductivity. Among these electrodes, particularly preferred for the transparent electrode layer is an optically thin (~50 nm) layer of ITO film. Another type of electrode that allows greater versatility and flexibility in the cell are so called compliant or conformable electrodes, which can stretch or bend with the elastomer. Such compliant electrodes are known in the art. In any event, the electrode resistance should preferably be low enough to allow the current to be drawn (as described below) without a significant voltage drop.

Any liquid crystal may be used in the present invention including thermotropic, lyotropic, and chromonic liquid crystals as well as polymeric liquid crystals and liquid crystal elastomers. Two types of exemplary materials include thermotropic and elastomeric liquid crystals. Although not intended to be limiting, typical organic classes of liquid crystal forming materials comprise both aromatic and aliphatic organic compounds such as benzylideneanilines, generally prepared from the reaction of para-substituted benzaldehyde and parasubstituted aniline; N-(p-alkoxybenzylidene)-p-amiostyrenes, prepared from the reaction of the appropriate aldehyde with p-aminostyrene; derivatives of beta sitosterol; active amyl ester of cyano benzylidene amino-cinnamate; p-phenylene containing compounds such as p-phenylene p-alkoxybenzoates; aminoacetophenones; aminopropiophenones; phenylenediamines; chlorophenylenediamines; terephthals; p,p'-disubstituted diphenylacetylenes; p,p'-disubstituted-1,4-diphenylbutadienes; p,p'-diisubstituted phenyl benzoates; substituted phenyl alkyl carbonates and diphenyl carbonates; p-n-alkyl benzoic acids; p-n-alkoxy benzoic acids; and Schiff bases prepared from p-substituted benzaldehydes and compounds of the following types: p-phenylenediamines, 4,4'-diaminobiphenyls, 4-phenylazoanilines, naphthylamines, and naphtylenediamines.

In one embodiment liquid crystal material is a chiral nematic liquid crystal. Such suitable liquid crystals include those conventionally used in twisted nematic (TN) displays. According to the present invention, the liquid crystal material may have a low or medium surface pretilt angle in the liquid crystal device.

While not necessary to the invention, in some instances it is preferable to provide the cell walls with alignment layers 20, 22 to provide for surface alignment of the liquid crystal molecules parallel to the cell walls, e.g., by providing the cell walls with rubbed polyimide layers or treating them with detergent or chemicals.

It is known that LC cells may act as capacitors whose capacitance changes due to director reorientation. The present embodiments propose to change the capacitance of the liquid crystal cell by mechanically changing the dielectric properties of the liquid crystal, thereby producing electrical energy. This electrical energy can then be used to, e.g., charge a battery.

A practical realization may be as follows:
1. A homeotropically aligned cell is connected to a battery with low voltage $V_L$, causing current to flow into the cell.
2. The cell is disconnected from the battery.
3. The liquid crystal is reoriented mechanically (such as by flow or movement of one or both plates or substrates) so that it is in the planar configuration, causing the voltage to rise.
4. The cell is connected to a battery with high voltage $V_H$, causing current to flow from the cell into the high voltage battery.
5. The cell is disconnected from the battery.
6. Flow stops, and the liquid crystal returns to its homeotropic configuration; the voltage drops.
7. the procedure is repeated from step 1.

In this process, charge from the battery at low voltage is put into the battery at high voltage. The load can be placed between the two batteries, so that the voltage applied to the load is $V_H$-$V_L$ and current drawn by the load flows from the high voltage battery to the low voltage one. $V_H$ and $V_L$ can vary, but may typically range from 8 to 15V for $V_H$ and 1 to 5 V for $V_L$. The liquid crystal generator described above effectively pumps current in the opposite direction, and replaces the charge. The process is optimized if $V_H/V_L = (\in_H/\in_L + 1)/2$, where $\in_H$ and $\in_L$ are the dielectric constants of the liquid crystal under high and low voltage, respectively. The connections/disconnections above can be simply accomplished with two diodes as described below.

Figure 2:
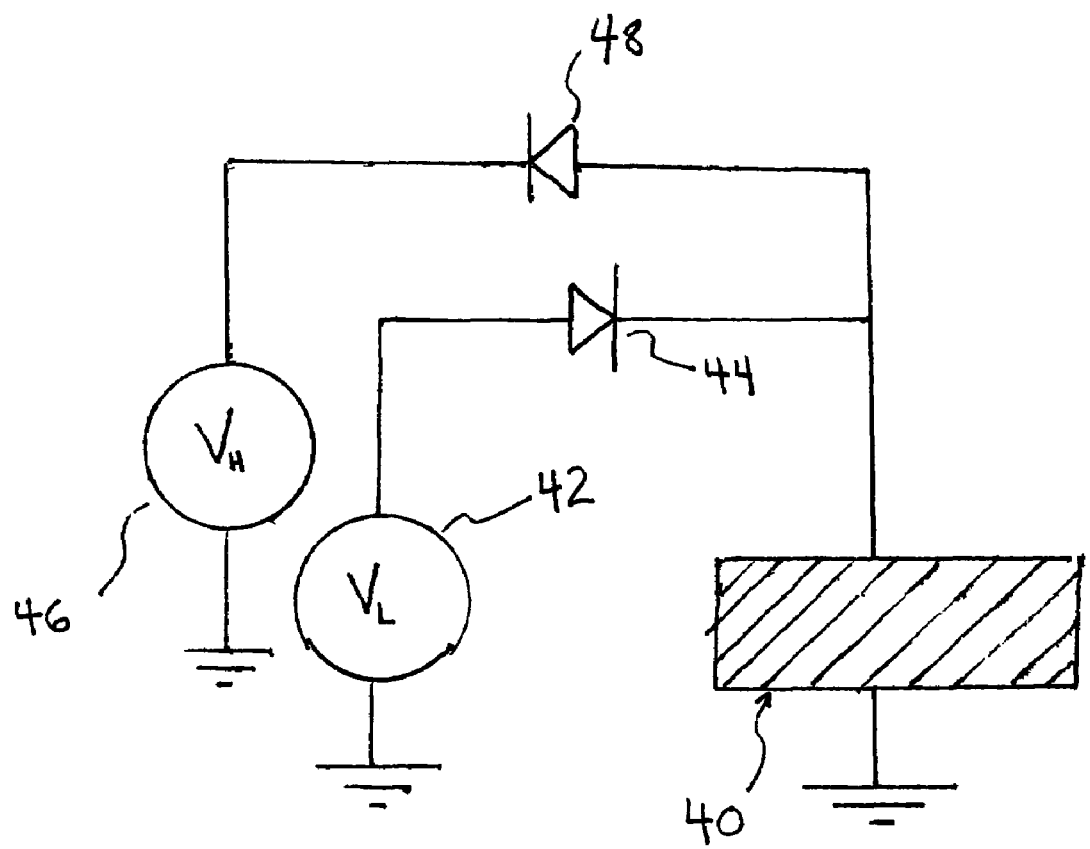
FIG. 2 is a depiction of a liquid crystal cell based power generating device.

One simple embodiment of this type of arrangement that allows for the above steps is provided in FIG. 2. In this arrangement, a liquid crystal cell 40 is connected to a lower voltage battery or other direct current voltage source 42 with a diode 44 allowing current to flow from the battery to the liquid crystal cell is positioned therebetween. A second higher voltage source 46 is connected to cell with a second diode 48 allowing current to flow from the cell to the battery positioned between the two. In operation, current from the low voltage battery 42 flows into the cell. The liquid crystal then reorients itself through flow or movement of the plate, causing the voltage in the cell to rise. Current then flows from the cell to the high voltage battery 46. Once flow stops, the liquid crystal returns to its homeotropic phase, allowing the procedure to be repeated.

The average power produced at frequency f is calculated as:

$$P = \frac{1}{4}CV_L^2 f\left(\frac{\varepsilon_H}{\varepsilon_L} - 1\right)^2$$

Wherein C is the low value of the capacitance of the liquid crystal cell and f is the frequency of mechanical excitation in the cell. In case of nematic liquid crystals, room temperature substances with dielectric anisotropy as high as $\Delta\varepsilon = \varepsilon_H - \varepsilon_L = 30$ and $\varepsilon_L = 10$ are commercially available. Assuming a film with d=10 µm having lateral dimensions of 10 cm×10 cm and frequency f=100 Hz, and a $V_L$=5V, the generated power would be about 1 mW per layer. Using multilayer stacks and by increasing the voltage, the power can be increased by several orders of magnitude, so that power production of 1 W may be attainable.

The generated power can also be greatly increased by using ferroelectric smectic liquid crystals cells with a helical structure. Such ferroelectric liquid crystals are commercially available. Several suitable non-limiting examples are shown in Table 1, along with some of there properties.

TABLE 1

| Name | Phase sequence (° C.) | $P_s$(nC/cm$^2$) | p (µm) | Producer |
| --- | --- | --- | --- | --- |
| FLC 6430 | Cr-SmC*-SmA-I <br> <-30  59  65 | 90 | 0.4 | La Roche |
| CS2003 | Cr-SmC*-N*-I <br> <-14  84  90 | 40 | 4 | Chisso, Co. |
| ZLI 3775 | Cr-SmC*-SmA-N*-I <br> <-30  61  76  85 | 29 | 6 | Merck |
| ZLI-4237-100 | Cr-SmC*-SmA-N*-I <br> <-20  61  73  81 | 20 | 10 | Merck |

At frequencies <1 kHz, these cells typically have very high capacitance, due to the high dielectric constant, which has been demonstrated in the literature to be:

$$\Delta\varepsilon_G = \frac{1}{8\pi\varepsilon_0 K}\left(\frac{pP}{\theta}\right)^2$$

where $K\sim 10^{-11}$ N is the elastic constant associated with the deformation of the helical structure, P is the ferroelectric polarization, $\theta\sim 0.5$ rad is a typical director tilt angle for such liquid crystals and p is the pitch of the helix. With easily achievable polarization of $10^{-3}$ C/m$^2$ and pitch of p~1 µm, the magnitude of $\Delta\varepsilon_G$ may be ~$10^4$, ie. a few hundred times larger than in the nematic liquid crystals. This dielectric constant can be reversibly decreased to a usual value of about 10 when the helix becomes almost unwound. This again can be achieved either by shear or compression.

It appears that even a single film, a few microns thick, of a ferroelectric liquid crystal can produce over 1 W of power, which is comparable to the reported power of cm thick heel-strike generators based on isotropic dielectric elastomers, developed by DARPA and the US Army. From Equation (1) one can see that it would be desirable to use thick film layers of liquid crystal material (d>100 um) with a pitch p of about 10 µm. In this case high voltages can be applied without unwinding the helix, so $\Delta\varepsilon_G$ values even as large as ~$10^{+6}$ can be achieved.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A device for generating electrical energy comprising a liquid crystal cell, a first voltage source, a first diode, a second voltage source, and a second diode; wherein said liquid crystal cell is arranged such that the capacitance of the liquid crystal cell may be altered by mechanically changing the dielectric properties of the liquid crystal by reorientation of the liquid crystal director; said first voltage source has a first voltage; said first diode allows current to flow from said first voltage source to said liquid crystal cell; said second voltage source has a second voltage; and said second diode allows current to flow from said liquid crystal cell to said second voltage source.

2. A device according to claim 1, wherein said liquid crystal cell comprises first and second substrates and a liquid crystal material deposited between said substrates.

3. A device according to claim 2, wherein said liquid crystal cell further comprises first and second alignment layers to promote either homogenous, homeotropic or tilted alignment of said liquid crystal material.

4. A device according to claim 2, wherein said liquid crystal material is at least one of thermotropic, lyotropic, chromonic, polymeric, elastomeric or a gel.

5. A device according to claim 2, wherein said liquid crystal material comprises a chiral nematic liquid crystal.

6. A device according to claim 2, wherein said liquid crystal material comprises a ferroelectric smectic liquid crystal.

7. A device according to claim 1, wherein said first and second voltage sources are batteries and wherein said first voltage ranges from 1 to 5 V and said second voltage ranges from 8 to 15 V.

8. A device according to claim 2, wherein reorientation of the liquid crystal director is effected by flow of the liquid crystal material or by movement of at least one of said substrates.

9. A method for producing electrical energy from the reorientation of a director in a liquid crystal cell, the method including the steps of connecting a first voltage source having a first voltage ($V_L$) to a liquid crystal cell containing homeotropically aligned liquid crystal molecules causing current to flow into the liquid crystal cell, disconnecting the liquid crystal cell from the first voltage source, reorienting a director of the liquid crystal molecules via the application of a mechanical stress thereby causing the voltage in the liquid crystal cell to rise, connecting a second voltage source having a second voltage ($V_H$) to the liquid crystal cell causing current to flow from the cell into the second voltage source, disconnecting the cell from the second voltage source, allowing the liquid crystal molecules to return to a homeotropic alignment, and, optionally, repeating the above steps.

10. A method according to claim 9, wherein $V_H/V_L=(\varepsilon_H/\varepsilon_L+1)/2$, where $\varepsilon_H$ and $\varepsilon_L$ are dielectric constants of the liquid crystal under second and first voltage, respectively.

11. A method according to claim 9, wherein said liquid crystal cell comprises first and second substrates and a liquid crystal material deposited between said substrates.

12. A method according to claim 11, wherein said liquid crystal cell further comprises first and second alignment layers to promote either homogenous or homeotropic alignment of said liquid crystal material.

13. A method according to claim 12, wherein said liquid crystal material is at least one of thermotropic, lyotropic, chromonic, polymeric or elastomeric.

14. A method according to claim 12, wherein said liquid crystal material comprises a chiral nematic liquid crystal.

15. A method according to claim 12, wherein said liquid crystal material comprises a ferroelectric smectic liquid crystal.

16. A method according to claim 12, wherein said liquid crystal material has thickness of greater than 100 μm and has a pitch of about 10 μm.

* * * * *